(12) United States Patent
Tanizaki et al.

(10) Patent No.: US 7,278,097 B1
(45) Date of Patent: Oct. 2, 2007

(54) DISPLAY METHOD OF SPATIAL DATA RELATIONSHIPS

(75) Inventors: Masaaki Tanizaki, Kodaira (JP); Shigeru Shimada, Kodaira (JP); Kazunori Watanabe, Yokohama (JP); Akira Ishii, Yokohama (JP)

(73) Assignees: Hitachi, Ltd., Tokyo (JP); Hitachi Software Engineering Co., Ltd., Yokohama (JP)

( * ) Notice: Subject to any disclaimer, the term of this patent is extended or adjusted under 35 U.S.C. 154(b) by 525 days.

(21) Appl. No.: 09/614,772

(22) Filed: Jul. 12, 2000

(30) Foreign Application Priority Data

Jul. 12, 1999 (JP) ................................. 11-197009

(51) Int. Cl.
*G06F 15/00* (2006.01)
*G06F 17/00* (2006.01)

(52) U.S. Cl. .................... 715/514; 715/501.1; 715/542; 715/763; 707/100

(58) Field of Classification Search ................ 715/514, 715/501.1–542, 500.1, 501, 763, 500; 707/104.1, 707/100, 1–42; 345/427, 428, 835
See application file for complete search history.

(56) References Cited

U.S. PATENT DOCUMENTS

| | | | | |
|---|---|---|---|---|
| 5,528,735 A | * | 6/1996 | Strasnick et al. | 345/427 |
| 5,555,354 A | * | 9/1996 | Strasnick et al. | 345/427 |
| 5,857,199 A | * | 1/1999 | Tamano et al. | 707/104.1 |
| 6,173,239 B1 | * | 1/2001 | Ellenby | 702/150 |
| 6,259,451 B1 | * | 7/2001 | Tesler | 345/419 |
| 6,326,962 B1 | * | 12/2001 | Szabo | 715/762 |
| 6,381,605 B1 | * | 4/2002 | Kothuri et al. | 707/100 |
| 6,564,263 B1 | * | 5/2003 | Bergman et al. | 709/231 |
| 6,577,714 B1 | * | 6/2003 | Darcie et al. | 379/93.17 |

FOREIGN PATENT DOCUMENTS

| | | |
|---|---|---|
| JP | 2277176 | 11/1990 |
| JP | 4364579 | 12/1992 |
| JP | 6168278 | 6/1994 |
| JP | 6272284 | 9/1994 |

(Continued)

OTHER PUBLICATIONS

Gordon, Robert F. et al., Hierarchical modeling in a graphical simulation system, ACM Winter Simulation Conference, New Orleans, 1990, pp. 499-503.*

(Continued)

*Primary Examiner*—William Bashore
(74) *Attorney, Agent, or Firm*—Mattingly, Stanger, Malur & Brundidge, P.C.

(57) ABSTRACT

For interactive operation between different enterprises or organizations, it is necessary to provide high-quality map information by not only displaying the results of retrieval from the map information servers of those organizations in a superimposed manner but also performing distributed retrieval on the basis of a relationship matched in sense between the servers. Thus, an interface is provided in which the optimum relationships between objects provided from the map servers distributed on the Internet environment and objects defined by a desired application are generated and a work of confirmation and modification by a user can easily be done. Thereby, a cost required for a complicated relating procedure indispensable to an interactive operating system is reduced.

22 Claims, 16 Drawing Sheets

FOREIGN PATENT DOCUMENTS

| | | |
|---|---|---|
| JP | 7048114 | 9/1996 |
| JP | 9265486 | 10/1997 |

OTHER PUBLICATIONS

M. Yamamuro, et al "A Schema Integration Support Methodology Using Data Standardization and Conceptual Graph Translation" Journal of IEICE, Nov. 25, 1996, No. J79-D-I, vol. 11, pp. 966-974.

G. Suguki et al "Method for Discovering Similar Schema Elements in Schema Integration", Papers in IEICE Autumn Conference of 1994, Information/Systems, Sep. 29, 1994, pp. 65, D62.

A. Sheth, et al "Federated Database System for Managing Distributed Autonomous Hetero Database", Computer Science, Jul. 1992, separated-volume, Jul. 10, 1002, pp. 72-74, separated-volume of bit.

T. Hoshino, et al "Relationship Information Estimation and Search In a Multi-Database Environment", Research report of IPSJ (Information Processing Society of Japan), Jul. 10, 1998, vol. 98, No. 58, pp. 389-396, 98-DBS-116-77.

\* cited by examiner

| APPLICATION NAME | GAS FACILITY MANAGEMENT | CUSTOMER INFORMATION MANAGEMENT | ... |
|---|---|---|---|
| COORDINATE SYSTEM | NATIONAL STANDARD NO. N SYSTEM | NATIONAL STANDARD NO. N SYSTEM | ... |
| AREA OF OPERATION | (CENTER X, CENTER Y, WIDTH, HEIGHT) | (CENTER X', CENTER Y', WIDTH', HEIGHT') | ... |
| SCALE | 1/500 | 1/2,500 | ... |
| UNIT | cm | m | ... |
| UPDATE TIME | MAR. 1999 | MAR. 1998 | ... |
| TARGET OBJECT | (GAS PIPE, MANHOLE, ROAD) | (BUILDING, ROAD) | |

FIG. 5

UTILITY — 501

| PROPERTY NAME | DATA TYPE |
|---|---|
| IDENTIFIER | INTEGER |
| SET UP DATA | TIME |
| FIGURE DATA | GEOMETRY |

MANHOLE — 502

| PROPERTY NAME | DATA TYPE |
|---|---|
| IDENTIFIER | INTEGER |
| SET UP DATA | TIME |
| CALIBER | INTEGER |
| DEPTH | INTEGER |
| FIGURE DATA | GEOMETRY |

GAS PIPE — 503

| PROPERTY NAME | DATA TYPE |
|---|---|
| IDENTIFIER | INTEGER |
| SET UP DATA | TIME |
| CALIBER | INTEGER |
| LENGTH OF PIPE | INTEGER |
| FIGURE DATA | GEOMETRY |

ROAD — 504

| PROPERTY NAME | DATA TYPE |
|---|---|
| NAME | VARCHAR |
| CLASSIFICATION | STRING |
| WIDTH | INTEGER |
| FIGURE DATA | GEOMETRY |

| SERVER NAME | GAS FACILITY MANAGEMENT SERVER |
|---|---|
| COORDINATE SYSTEM | NATIONAL STANDARD NO. N SYSTEM |
| MANAGEMENT AREA | {CENTER X, CENTER Y, WIDTH, HEIGHT} |
| SCALE | 1/500 |
| UPDATE TIME | DEC. 1999 |
| OBJECT NAME | {PIPE, MANHOLE, ROAD} |

602

| SERVER NAME | WATERWORKS MANAGEMENT SERVER |
|---|---|
| COORDINATE SYSTEM | NATIONAL STANDARD NO. N SYSTEM |
| MANAGEMENT AREA | {CENTER X, CENTER Y, WIDTH, HEIGHT} |
| SCALE | 1/1,500 |
| UPDATE TIME | APR. 1999 |
| OBJECT NAME | {BUILDING, WATER PIPE, ROAD} |

FIG. 8

BUILDING — 801

| PROPERTY NAME | DATA TYPE |
|---|---|
| CUSTOMER NUMBER | INTEGER |
| HOUSEHOLDER | STRING |
| ADDRESS | STRING |
| TELEPHONE NUMBER | INTEGER |
| FIGURE DATA | GEOMETRY |

WATER PIPE — 802

| PROPERTY NAME | DATA TYPE |
|---|---|
| IDENTIFIER | INTEGER |
| UPDATE TIME | TIME |
| CALIBER | INTEGER |
| LENGTH | INTEGER |
| FIGURE DATA | GEOMETRY |

ROAD — 803

| PROPERTY NAME | DATA TYPE |
|---|---|
| NAME | STRING |
| CLASSIFICATION | STRING |
| WIDTH | INTEGER |
| FIGURE DATA | GEOMETRY |

| TARGET WORD | SYNONYMS | NARROW SENSE WORDS | WIDE SENSE WORDS |
|---|---|---|---|
| ROAD | {STREET, AVENUE} | {FREEWAY, HIGHWAY,...} | {TRANSPORTATION} |
| BUILDING | {STRUCTURE,...} | {HOUSE,...} | {CONSTRUCTION} |
| RAILWAY | {RAILROAD, TRAMWAY...} | {NATIONAL RAILWAY, PRIVATE RAILWAY...} | {TRANSPORTATION} |
| ... | ... | ... | ... |

| APPLICATION NAME | APPLICATION OBJECT NAME | SERVER NAME | SERVER OBJECT NAME | SIMILARITY |
|---|---|---|---|---|
| GAS FACILITY MANAGEMENT | ROAD | WATERWORKS MANAGEMENT SERVER | ROAD | 1 |
| GAS FACILITY MANAGEMENT | FACILITY | WATERWORKS MANAGEMENT SERVER | WATER PIPE | $\alpha$ |
| CUSTOMER INFORMATION MANAGEMENT | BUILDING | WATERWORKS MANAGEMENT SERVER | BUILDING | 1 |
| CUSTOMER INFORMATION MANAGEMENT | ROAD | WATERWORKS MANAGEMENT SERVER | ROAD | 1 |
| ... | ... | ... | ... | ... |

DISPLAY METHOD OF SPATIAL DATA RELATIONSHIPS

BACKGROUND OF THE INVENTION

Public utility enterprises for electric supply, gas supply, communication service, etc. and the waterworks/sewerage management divisions, public works divisions, etc. of local governments need maps and facility drawings for performing the maintenance and management of their facilities. Up to date, such enterprises and local governments have proceeded with data reduction or consolidation through the digitalization of maps and facility drawings.

On the other hand, the progress of network-related technologies represented by optical communication networks, ATM and so on is bringing forth the recent situation in which the communication of a large volume of data on the Internet environment is enabled. Therein, the handling of map information requiring a large capacity is now realizable.

In such circumstances, it is desired that maps and facility drawings managed by individual organizations are communized through the Internet to improve the efficiency by substituting the on-line communication of data for the off-line data data communication which has hitherto been made. Namely, each enterprise or organization manages its facility drawings but is not concerned in the management of facility drawings which are to be managed by another enterprise or organization. Therefore, what is to be done by each enterprise or local government when an actual construction work is to be executed, includes collecting the drawings of individual facilities installed at a location to be subjected to construction work and making the registration or superimposition of the facility drawings to grasp the arrangement of facilities.

This registration of facility drawings requires a user not only to simply unify the coordinate systems and units of facility drawings provided from respective enterprises and local government but also to select user's desired objects or targets from among these drawings with different contents of description so that the selected objects are displayed in a super-imposed manner. Normally, map information on facility drawings or the like includes an assembly of plural objects classified for the respective types of subjects. Also, different names/definitions are respectively employed by the organizations or enterprises possessing the facility drawings. Accordingly, the above-mentioned selection of user's desired objects is not easy.

Up to date, the activities for standardization by ISO/TC112, Open GIS and so on have exhibited, for example, the notation of the location and outline of map information by meta data, and the prescription of a common interface between different types of GIS's by a distributed object technology.

For actual realization of the mutual utilization of map information, however, it is necessary to make, with respect to the respective objects included in map information provided from different organizations, the determination of how are they associated with an object architecture used in an organization to which the user belongs, as mentioned above. In connection with this, the existing conditions are such that the association of objects with each other (or the generation of a relationship) is made relying upon a manual work by the user.

SUMMARY OF THE INVENTION

Thus, the present invention provides an interface in which when different organizations or enterprises desire to share their held map information therebetween, meta data describing the property of each map information is interpreted to make the association of objects between its own organization and another organization and the procedure for unification for differences in coordinate system and unit therebetween, thereby allowing a user to decide the optimum relationship easily.

These and other objects, features and advantages of the present invention will become more apparent in view of the following detailed description of the preferred embodiments in conjunction with accompanying drawings.

BRIEF DESCRIPTION OF THE DRAWINGS

FIG. 5 shows object property structure data of application;

FIG. 6 shows server definition data;

FIG. 8 shows object property structure data of server;

FIG. 12 shows thesaurus data;

FIG. 13 shows object relationship data;

DESCRIPTION OF THE EMBODIMENTS

Figure 1:
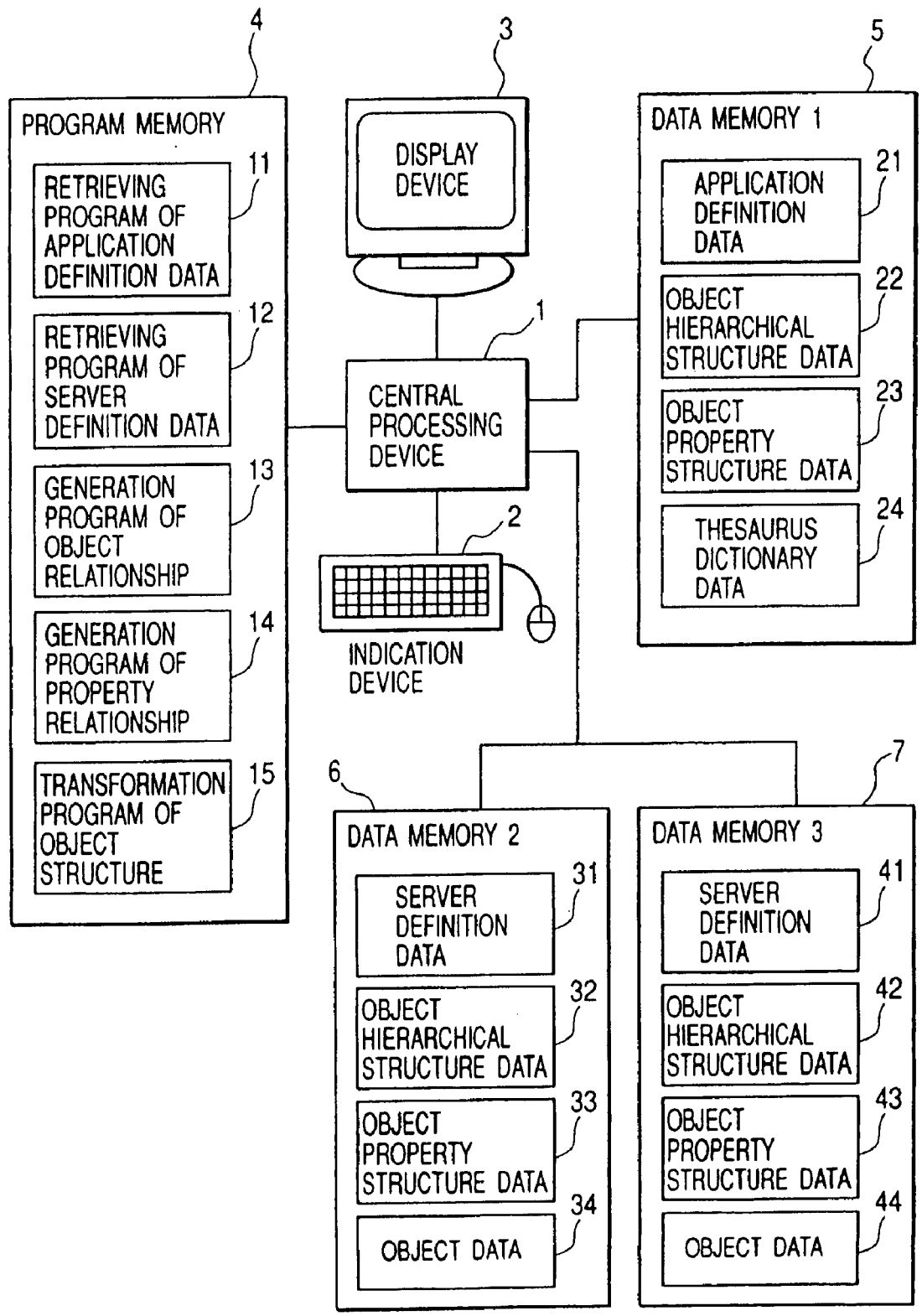
FIG. 1 shows the overall construction of a system of the present invention.

Embodiments of the present invention will now be described. FIG. 1 is a diagram showing the construction of a system for performing a relationship display processing according to the present invention. Reference numeral 1 denotes a central processing device for performing each program, numeral 2 an indication device which a user operates, numeral 3 a display device for displaying the result of execution of each program, numeral 4 a program memory for storing programs required for processings performed by the central processing device 1, and numerals 5, 6 and 7 data memories for storing data used by those programs.

The program memory 4 is stored with four types of programs including an application definition data retrieving program 11 for retrieving each data from the data memory 5, a server definition data retrieving program 12 for retrieving each data from the data memory 6 or 7, an object relationship generation program 13 for generating relationships between objects defined by an application and objects defined by a server, a property relationship generation program 14 for generating relationships between properties possessed by the respective objects related or associated with each other, and an object structure transformation program 15 for transforming or converting an object provided from the server into an object structure defined by the application.

The data memory 5 is stored with four types of data as follows. Reference numeral 21 denotes application definition data representing the outline of an application, numeral 22 object hierarchical structure data representing the hierarchical structure of objects applied in the application, numeral 23 object property structure data representing what property architecture does each object possess, and numeral 24 thesaurus data representing a relationship between names, the thesaurus data being used in an object relationship generation processing.

Each of the data memories 6 and 7 is stored with four types of data as follows. Reference numeral 31 or 41 denotes server definition data representing the outline of a server represented by that data memory, numeral 32 or 42 object hierarchical structure data representing the hierarchical structure of objects provided from the server, numeral 33 or 43 object property structure data representing what property architecture does each object possess, and numeral 34 or 44 object data representing data of the actual map or drawing.

Figure 2:
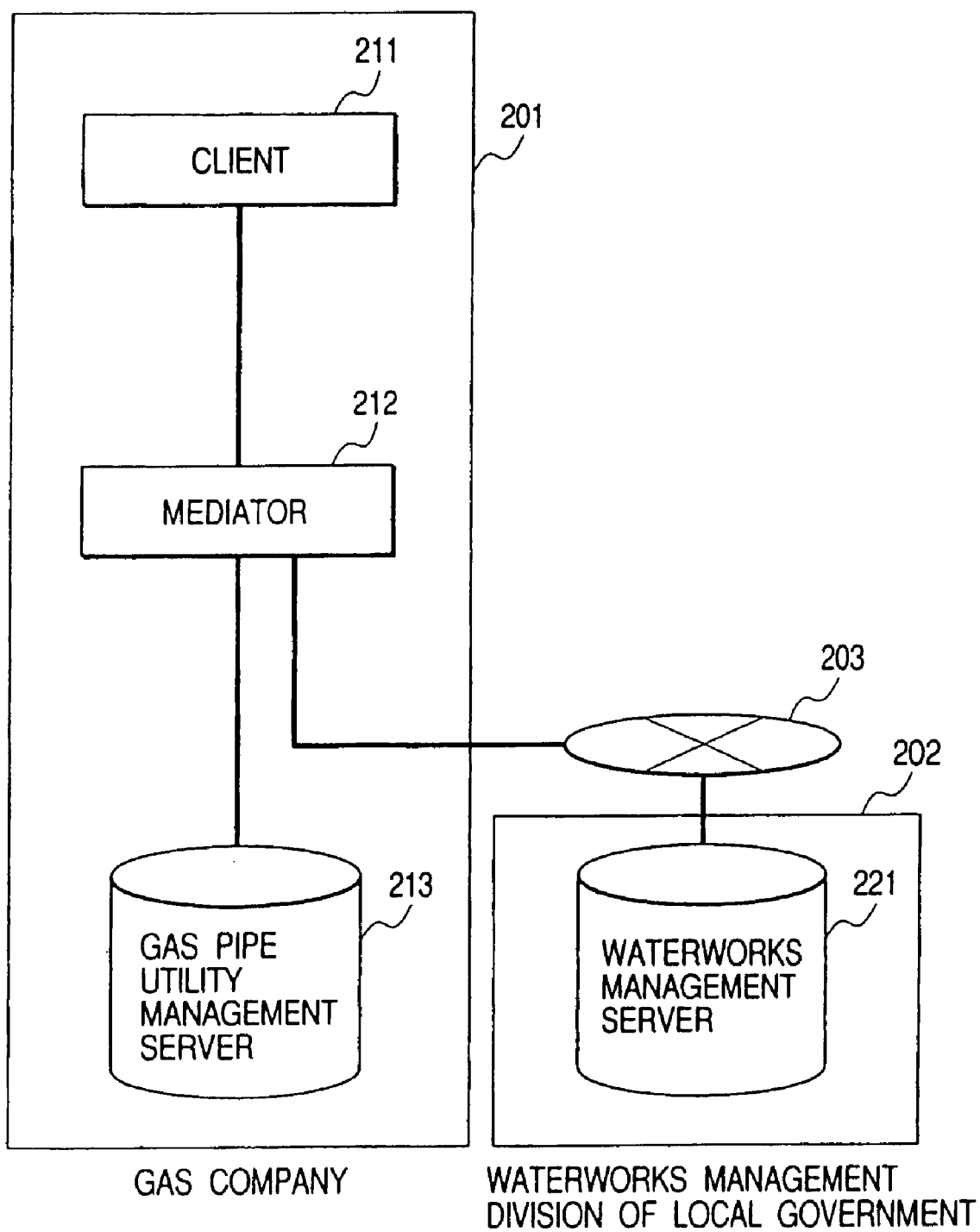
FIG. 2 shows the construction of the system on the Internet environment.

Next, the description using FIG. 2 will be made in conjunction with the exemplified case where the system construction shown in FIG. 1 is applied to an interactive operation between a gas company and the waterworks management division of a local government. In the construction shown in FIG. 2, a gas pipe utility management enterprise 201 and a local government 203 are connected through the Internet 203. The gas pipe utility management enterprise 201 includes a gas pipe utility management server 213 which corresponds to the data memory 6 shown in FIG. 1 and manages maps/drawings, a mediator 212 which corresponds to the central processing device 1, the indication device 2, the display device 3, the program memory 4 and the data memory 5 shown in FIG. 1, and a client terminal 211 which executes various application programs. It is general that within the same enterprise, the data consolidation and application development are made on the basis of object definition which is equal between a server and an application. Under this premise, it is assumed that in the same enterprise, the above-mentioned application definition data and server definition data are equal to each other and each of the above-mentioned object hierarchical structure data and object property structure data is equal between the application and the server. On the other hand, the local government 202 includes a waterworks management server 221 which corresponds to the data memory 7 shown in FIG. 1 and manages waterworks-related maps/drawings based on object definition different from that in the gas pipe utility management enterprise.

In substance, the shown system construction is encompassed with a group of servers of many other organizations/enterprises connected to the Internet 203 in order to effect the mutual utilization of individually held maps, drawings and so on therebetween. For simplicity of illustration, however, the description will herein be made with only one of other servers made an object of interactive operation. Also, the system provided by the present invention is applicable to not only the interactive operation on the Internet environment but also the interactive operation of maps and drawings between a plurality of sections or divisions in an enterprise or organization. In the latter case, the Internet 203 is replaced by an intranet.

Further, each server may employ a variety of forms as software for managing maps and drawings. However, it is herein assumed that there is equipped a wrapper program by which a map or drawing provided from each server is converted into the form of object. An example of the structure of the wrapper program may be a system in which it is developed in accordance with the interface prescription indicated by the Open GIS.

Figure 7:
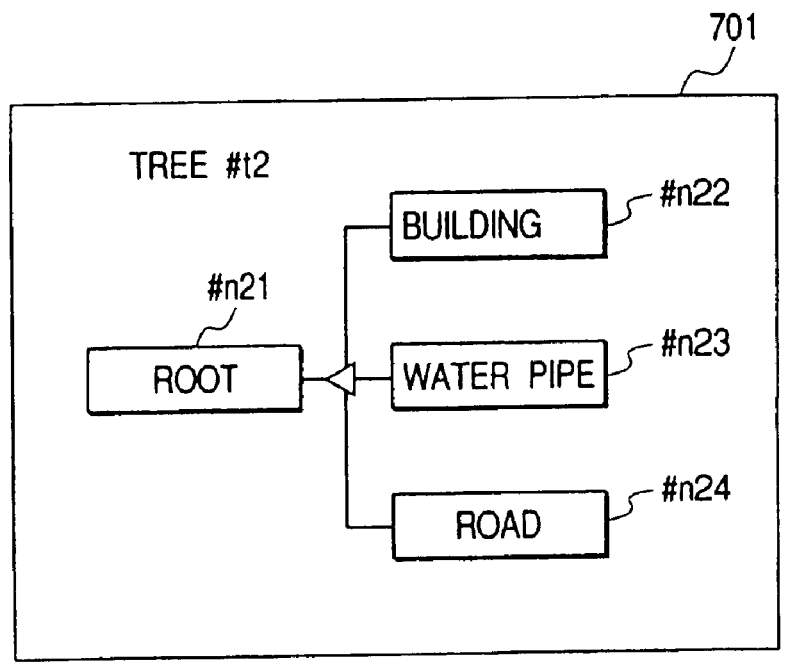
FIG. 7 shows object hierarchical structure data of server.

Now, the structure of each data in the system construction shown in FIGS. 1 and 2 will be described using FIGS. 3 to 5 which show data defining applications and FIGS. 6 to 8 which show the contents of data provided from servers.

Figure 3:
FIG. 3 shows application definition data.
Figure 4:
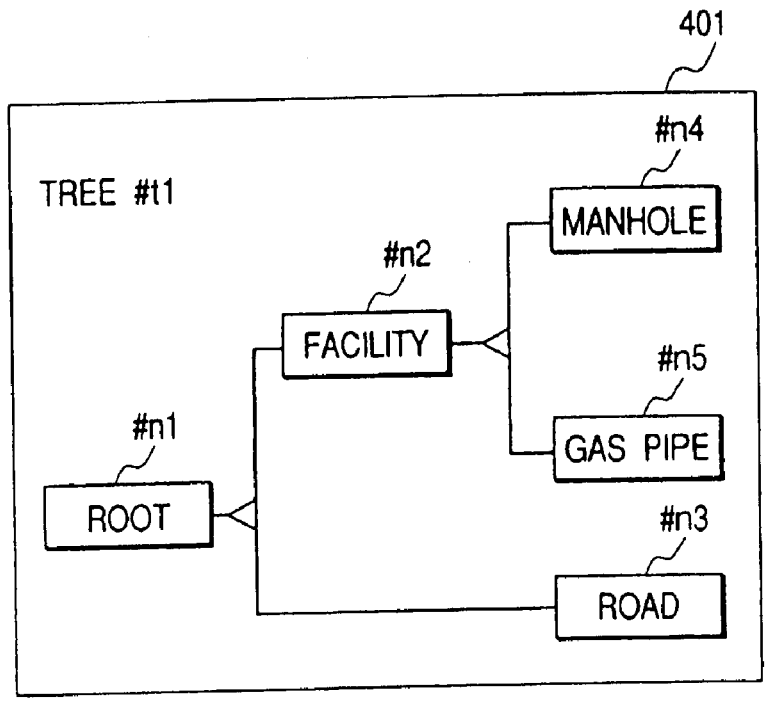
FIG. 4 shows object hierarchical structure data of application.

FIG. 3 shows the data structure of application definition data which corresponds to 21 in FIG. 1. There is shown the specification of applications used in the gas company. Referring to the data structure 301 shown in FIG. 3, it has, for each application, items which include name of application, coordinate system, area of operation, name of target object, and so on. A plurality of such applications are provided in accordance with each work and target (or applied) objects are specified for each application.

Objects applied in each application normally take a hierarchical structure. A parent/child relationship between objects in the hierarchical structure may include an is-a relationship and a part-of relationship. Herein, an example of a construction having association based on the is-a relationship is shown by 401 in FIG. 4. A data structure for representing the hierarchical structure is shown by 402 in FIG. 4. With each object taken as a node, it includes node name, parent node ID and child node ID.

As shown in FIG. 5, each object is composed of a plurality of properties and each property may include numerical type data such as integer and short, character string type data such as string, and figure type data such as line and plane representing figure data. Reference numerals 501 to 504 denote the respective data structures of objects applied in a gas facility management application and each data structure includes numerical type data, character string type data, and figure type data in the case of an object with a figure. Namely, it is meant that in a program of the gas facility management application, only objects based on those data structures are made an object of processing. FIGS. 4 and 5 correspond to 22 and 23 in the system construction shown in FIG. 1.

Next, the description will be made of data provided from the servers. Each server holds server definition data, as shown by 601 or 602 in FIG. 6, which represents the outline of map/drawing information provided from that server. The server definition data has items including the name of a server, a coordinate system on which figure data depends, a management area which represents the area of data managed by the server, and so on. Such server definition data is registered in each server. Namely, the server definition data 601 corresponds to 31 in FIG. 1 and the data 602 corresponds to 41. In the example shown in FIG. 2, the data 601 is stored in the gas pipe utility management server 213 and the data 602 is stored in the waterworks management server 221.

Objects described in the server definition data (or indicated in the item of object name) take a hierarchical structure based on association such as an is-a relationship, a part-of relationship or the like, as in the case of the object hierarchical structure data of application mentioned above. Hierarchical structure data concerning the objects defined by the server definition data 602 shown in FIG. 6 is shown in FIG. 7. For contents, the hierarchical structure is described as a data structure in which a parent/child relationship between nodes is described, in a manner similar to that in FIG. 4. The data structure is stored in the corresponding server. Namely, if the waterworks management server corresponds to 7 in FIG. 1, FIG. 7 shows the contents of 42 in FIG. 1.

Reference numerals 801 to 803 in FIG. 8 denote the respective property structures of objects described in the above-mentioned server definition data. This structure shows the data structure of each object provided from the corresponding server and each property includes numerical type data, character string type data, figure type data or the like. Real data according to those property structures is stored as object data in each server. Namely, the object property structure data and the object data are stored in the gas pile utility management server 213 or the waterworks management server 221 in FIG. 2.

The server definition data, object hierarchical structure data, object property structure data and object data described in the above are normally defined such that each data has a matching between an application and a server in the same enterprise or organization. However, when a connection is established between different enterprises or organizations, as shown in FIG. 2, it is of course that no matching is obtained in many cases. Thus, in the present invention, the association of objects different in hierarchical structure and/or property structure between the server and the application is made by performing a processing for generation of a relationship between objects. The object relationship generation processing will subsequently be described. By performing a conversion processing based on this association, objects different in definition between the enterprises or organizations are made mutually available. The relationship generation processing according to the present invention will now be described.

A procedure for generating relationships between objects provided from a plurality of servers and objects defined on the application side so that they are decided by a user on an interface will be described by use of FIG. 9. FIG. 10 shows the interface in this case. In the processing shown in FIG. 9, definition data and object structure data of application and those of server are first acquired or retrieved (steps 901 and 902). Next or in step 903, relationships between objects of application and objects of server are generated on the basis of a system which will be mentioned later on. The confirmation is made of whether or not the relationships obtained in step 903 are the optimum. More particularly, the user's indication operations shown in steps 906 to 908 are performed to modify the generated relationships, as required, thereby deciding the optimum relationships. The modification and confirmation of the object relationships obtained in step 903, the modification and confirmation of relationships between properties possessed by the associated objects, and the modification and confirmation of relationships while actually displaying figure data possessed by object data are respectively made in steps 906, 907 and 908 by use of an interface which will subsequently be described.

FIG. 10 shows the interface which performs the above-mentioned indication operations. The interface includes an application selecting menu for displaying a plurality of applications in the form of a list to select an object of operation by use of an indication device, and a server selecting menu for displaying a plurality of servers in the form of a list to select an object of operation by use of the indication device. The names of applications and servers acquired in steps 901 and 902 in FIG. 9 are displayed as the application and server lists. In FIG. 10, a situation is shown in which a gas facility management application is selected by the application selecting menu and a waterworks management server as a server corresponding to the selected application is selected by the server selecting menu.

The interface further includes an application object hierarchical structure indicator for displaying the names and hierarchical structure of objects applied in the application selected by the application selecting menu, and a server object hierarchical structure indicator for displaying the names and hierarchical structure of objects provided from the server selected by the server selecting menu. Data shown in FIG. 4 and data shown in FIG. 7 are displayed on those menus on the basis of that view such as is-a hierarchy, part-of hierarchy or the like in a list of the types of object hierarchy displayed by a view selecting menu which the user selects by use of the indication device. In FIG. 10, the hierarchical structure data of objects defined by the gas facility management application and the hierarchical structure data of objects provided from the waterworks management server are displayed on the application and server object hierarchical structure indicators, respectively.

Figure 9:
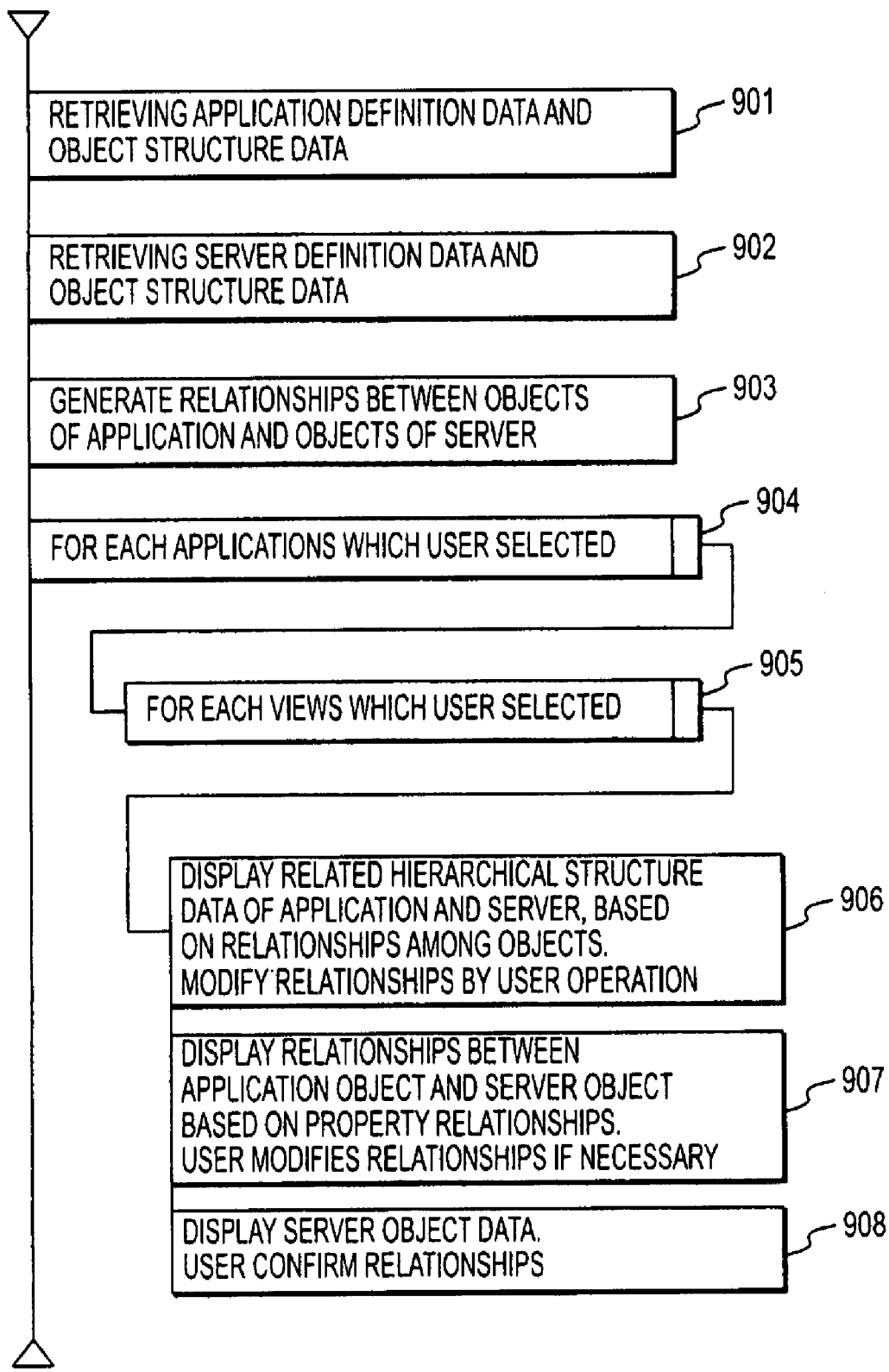
FIG. 9 shows the flow of a relationship generation processing.
Figure 10:
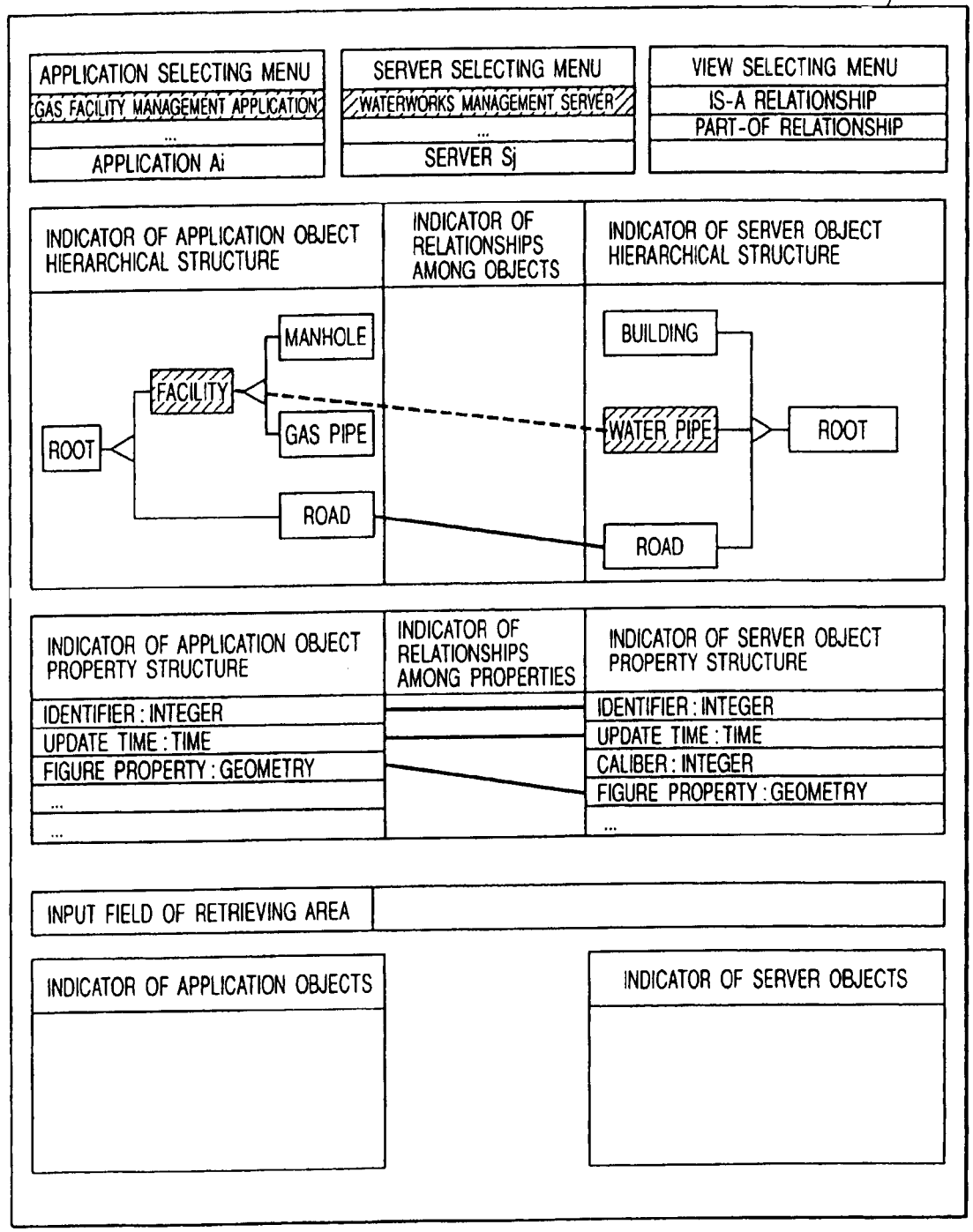
FIG. 10 shows an interface for displaying relationships.

On an object relationship indicator located between the application and server object hierarchical structure indicators, there are displayed relationships between the application objects and the server objects on the basis of the result of processing in step 903 in FIG. 9. At this time, for exhibiting the order of the degree of certainty of the relationship (or the degree of association between objects) to the user, lines indicating the relationship are displayed with the thickness or type thereof distinguished in accordance with the value of similarity obtained as the result of the processing for generation of relationships between objects. In the example shown in FIG. 10, the relationship having the similarity equal to 1 is displayed by solid line and the relationship having the similarity equal to α is displayed by dotted line. The details of the processing for generation of relationships between objects will be mentioned later on.

In order to displaying relationships between the property structures of objects associated by the object relationship indicator, the interface is further provided with an application object property structure indicator and a server object property structure indicator. The property structure of an object selected on the application object hierarchical structure indicator is displayed on the application object property structure indicator, and the property structure of an object selected on the server object hierarchical structure indicator is displayed on the server object property structure indicator. On a property relationship indicator located between the application and server object property structure indicators, there are displayed relationships between the application object properties and the server object properties on the basis of property relationship data obtained as the result of a property relationship generation processing which will be mentioned later on. As required, the user is urged to confirm the displayed relationships.

The final confirmation/decision of the relationships between objects is made in such a manner that object data of areas designated by an input field of retrieving area (or a retrieving position designator) is actually displayed on an application object indicator and a server object indicator located at a lower portion of the interface. The retrieval and display of object data requires the conversion of figure data inclusive of coordinate system and unit different for each server and the conversion of property data. The details of such conversion will be mentioned later on.

Figure 11:
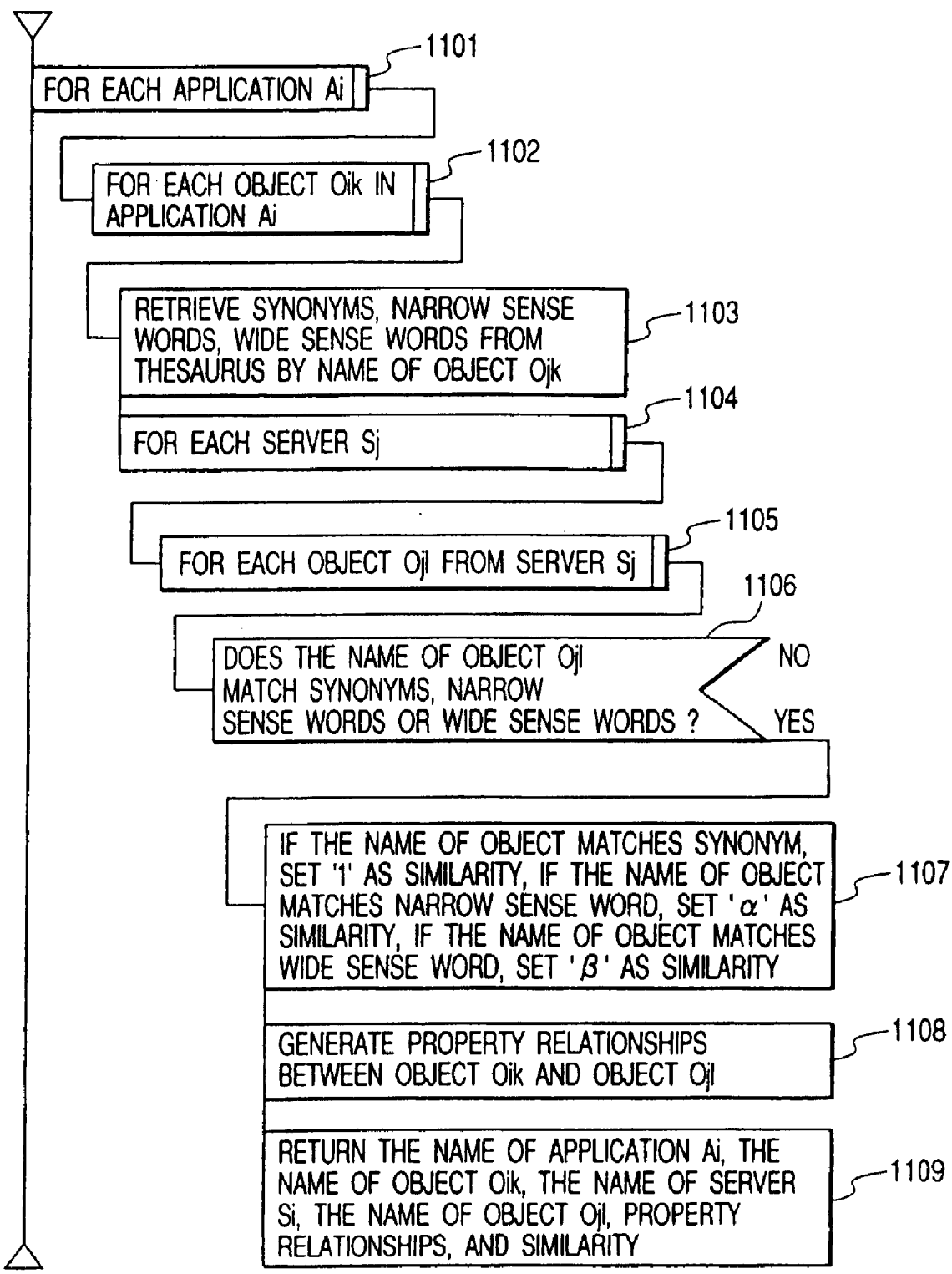
FIG. 11 shows the flow of an object relationship generation processing.

The flow of the object relationship generation processing will now be described using FIGS. 11, 12 and 13. This processing corresponds to step 903 in FIG. 9. In the present processing, the collection of application definition data acquired in step 901 in FIG. 9 and the collection of server definition data acquired in step 902 are subjected to the generation of relationships between objects defined by both the definition data. First, the generation is repeated for each retrieved application Ai (step 1101) and for each object Oik defined by the application Ai (step 1102). In step 1103, thesaurus data shown in FIG. 12 is searched with the name of the object Oik used as a key. The thesaurus data includes target words, synonyms equivalent in sense to the target words, narrow sense words narrower in sense than the target words, and wide sense words wider in sense than the target words. Herein, the replacement of the name of the object Oik by synonyms, narrow sense words and wide sense words is made using the thesaurus data. And, the assembly of words obtained by the replacement is compared with objects defined by the server definition data. For this purpose, the comparison of the name of the object Oik defined by the application Ai and the name of an object Ojl defined by a server Sj is made for each retrieved server definition data and for each object defined by that server definition data (steps 1104 to 1106). At this time, the similarity is applied for the combination of names the comparison of which results in a matching (step 1107). In the case where the matching with the synonym is obtained, the similarity is set to 1. In the case where the matching with the narrow sense word is obtained, the similarity is set to $\alpha$. In the case where the matching with the wide sense word is obtained, the similarity is set to $\beta$. The similarities $\alpha$ and $\beta$ are defined to be decimals smaller than 1. Next, property relationships between Oik and Ojl associated with each other are determined (step 1108). This is a processing for generating relationships between properties defined by the object Oik and properties defined by the object Ojl. The details of this processing will be mentioned later on. In step 1109, the application Ai, object Oik, server Sj, object Ojl, similarity and property relationship obtained as the result of the above processing are saved or returned. The resulting object relationship data is shown in FIG. 13. With the foregoing process, it is possible to determine which of objects provided from the server is applied in the application. Next, the description will be made of a processing for generating relationships between property structures among objects associated or related with each other through the above processing.

Figure 14:
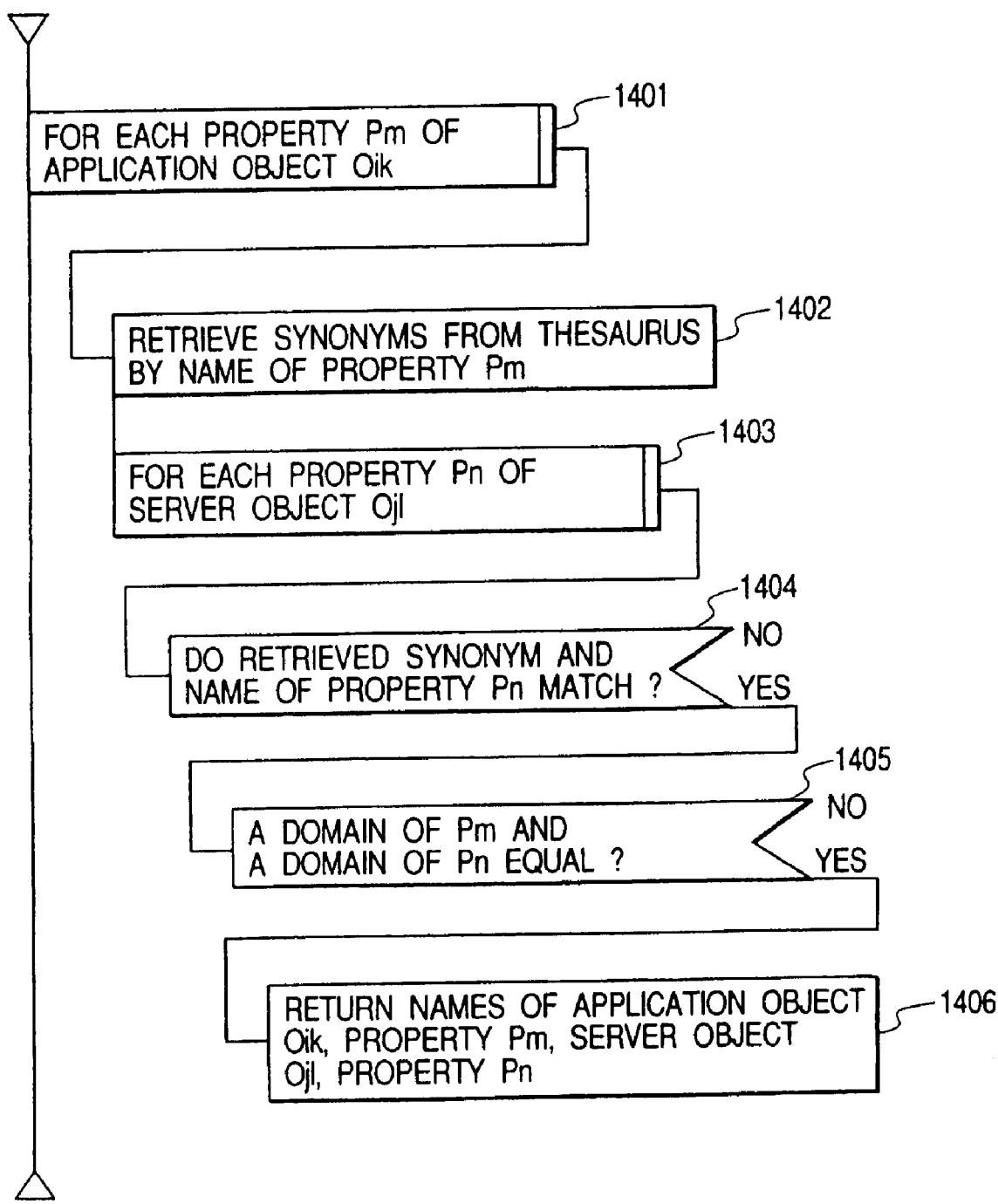
FIG. 14 shows the flow of a processing for generation of property relationships between objects.
Figure 15:
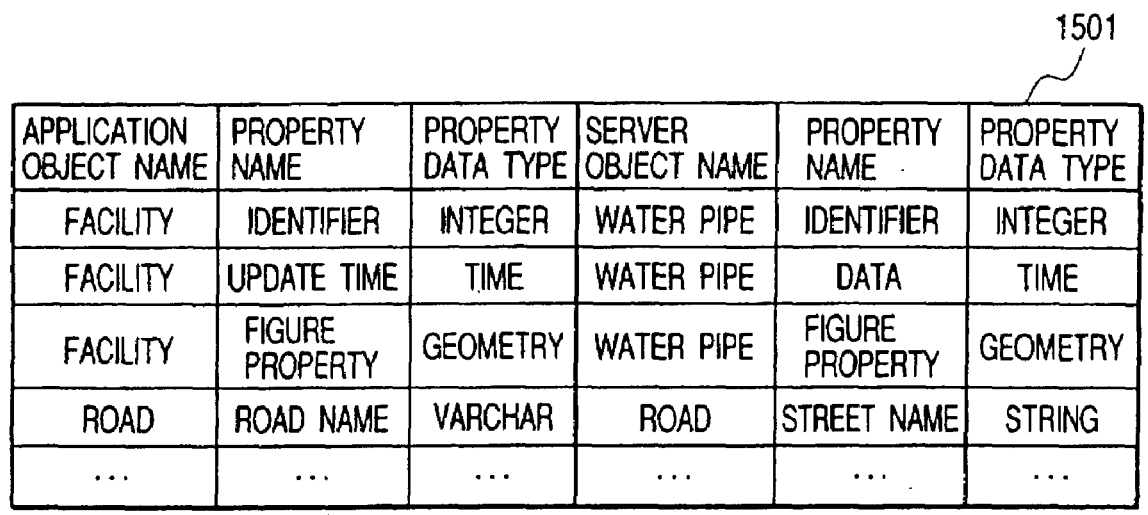
FIG. 15 shows property relationship data.

The flow of the processing for generation of property relationships between objects will be described using FIGS. 14 and 15. This processing corresponds to step 1108 in FIG. 11. It is determined which one of properties possessed by one of the related objects Oik and Ojl does a property possessed by the other object correspond to. More particularly, the application object Oik and the server object jl related with each other are subjected to the following. First, provided that properties possessed by Oik are Pm, the thesaurus is searched for each property Pm (that is, successively with respect to all m's) to retrieve synonyms for which the name of that property Pm matches with the target word. Subsequently, for each of properties Pn held by Ojl, the judgement is made of whether or not the name of that property Pn matches with the retrieved synonym. In the case where the matching is obtained, the judgement is made of whether or not Pm and Pn have the same domain. The domain herein referred to indicates the classification of a data type possessed by the property and may include numerical type, character string type, figure type and so on. With the above judgement, the combination of properties having their names equivalent in sense and their data types belonging to the same classification is determined. By thus making the judgement with respect to all combinations of Pm of Oik and Pn of Ojl, the property relationships between Oik and Ojl are generated. As a result, there is obtained property relationship data, as shown in FIG. 15, which is composed of application object names, server object names, and the names and data types of related properties Pm and Pn.

With the object relationship generation processing and the property relationship generation processing mentioned above, it is possible to determine relationships between objects provided from each server and objects defined by an application based on names and data structures. In addition thereto, the present invention makes the determination of relationships based on the contents of figure data possessed by objects. For that purpose, the present invention provides a processing and an interface with which the result of display of actually retrieved objects is offered to the user for confirmation. This will now be described using FIGS. 16 and 17.

Figure 16:
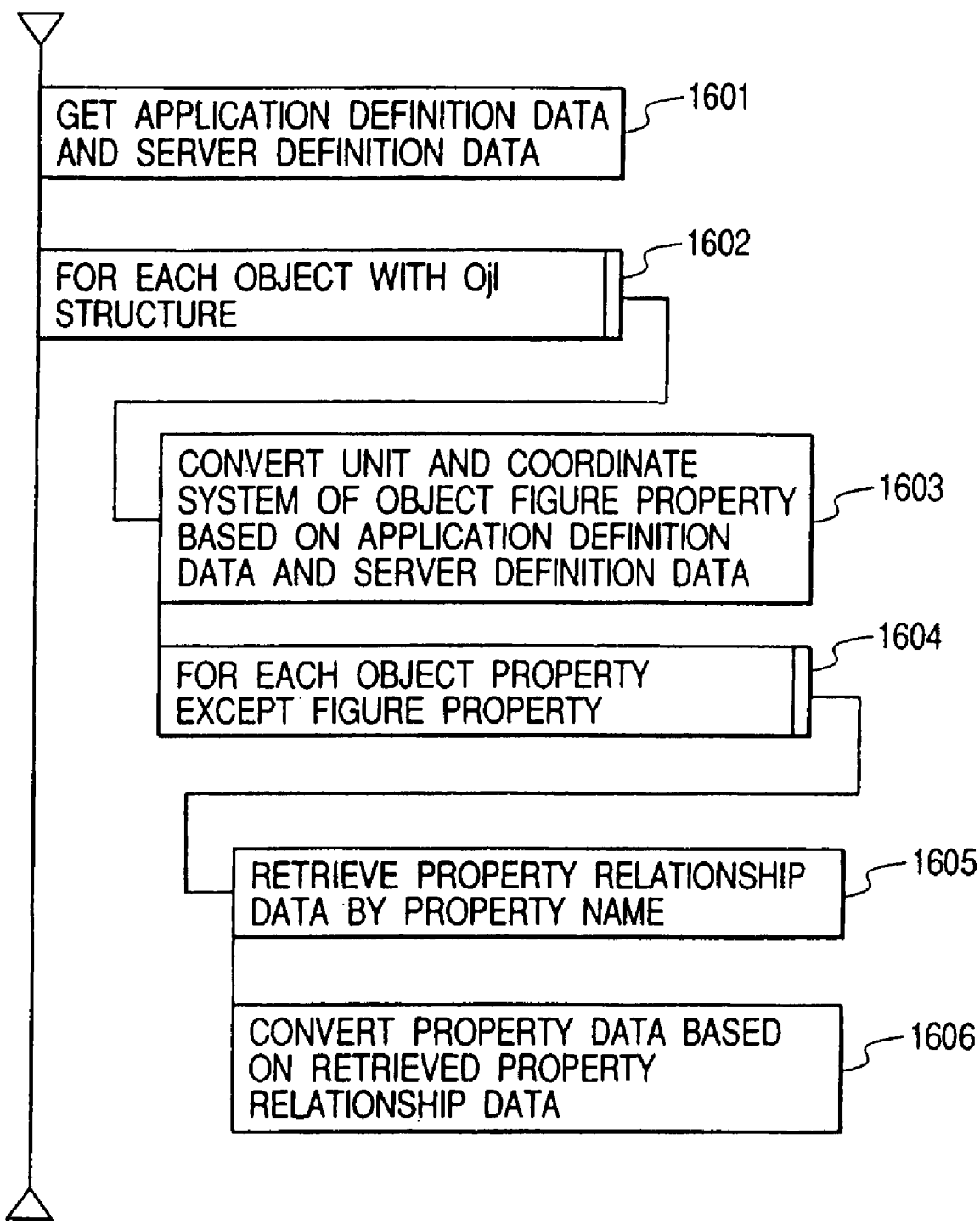
FIG. 16 shows the flow of an object structure conversion processing.

FIG. 16 shows the flow of a processing for converting object data retrieved from the server into an object structure defined by the application. In this processing, for a figure property possessed by an object, the conversion of figure data is made on the basis of the values of coordinate system, unit and so on described by the application definition data and the server definition data. For properties except the figure property, on the other hand, the conversion of the type and value of each property is made on the basis of property relationship data obtained as the result of the property relationship generation processing shown in FIG. 14.

Figure 17:
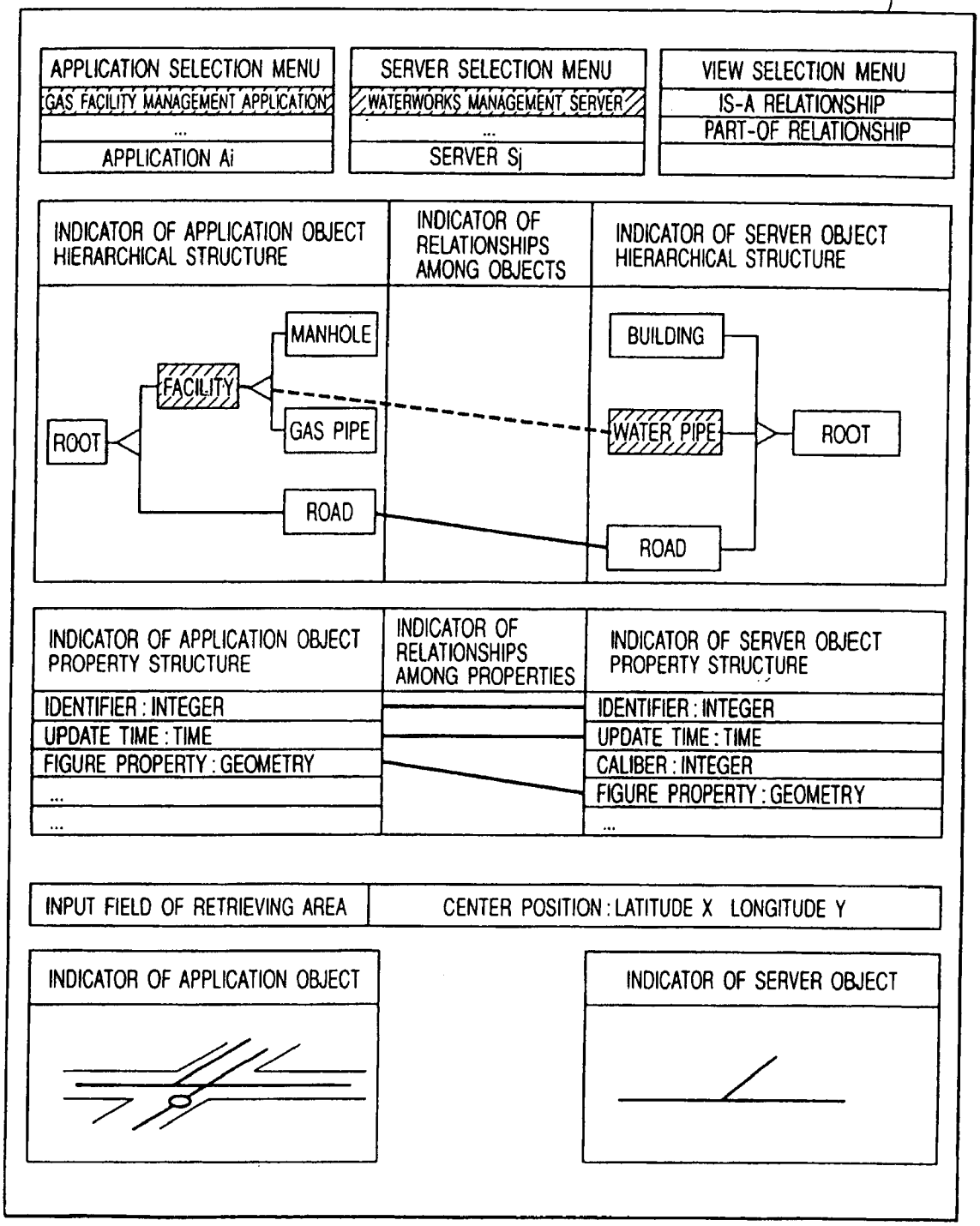
FIG. 17 shows an example of object retrieval on the relationship displaying interface.

FIG. 17 shows an example of display on the interface on which object data obtained as the result of conversion processing mentioned above is displayed to obtain the confirmation by the user. On the application object indicator, there is displayed the superimposition of object data of an object selected on the application object hierarchical structure indicator and figure data of an object selected on the server object hierarchical structure indicator which figure data is data after conversion. On the server object indicator, on the other hand, only an object selected on the server object hierarchical structure indicator is displayed. With these indicators, it is possible to make the confirmation of what figure data does a server object possess and the confirmation of a situation when the server object data or figure data is displayed together with another object data in a superimposed manner on the application object indicator. On the basis of such result of display, the user can judge whether or not desired map information is obtained and it is therefore possible for the user to make the proper selection of a server and a server object.

After user confirmed the object relationships, child objects of related objects and objects subsequent to the child objects are omitted. For example, manhole object and gas pipe object would be hidden in FIG. 17.

The present invention also allows that when displaying the object heirarchical structure data, the form of the display is changed depending on the type of a parent/child relationship between the objects. Further, when displaying the object hierarchical structure data, an object of a lowermost layer and an object of an intermediate layer are distinctly displayed.

The present invention further provides that when displaying a relationship between the objects, a similarity between the objects is displayed in a form reflected by types of lines or thickness of the lines. According to the present invention the relationship between the objects is displayed so that child objects of related objects and objects subsequent to the child objects are omitted. Futher, according to the present invention the relationship between the objects is displayed in an order of a degree of certainty representing a height of a degree of association between the objects.

According to the present invention described in the foregoing, there is provided an interface in which the optimum relationships between objects provided from map servers distributed on the Internet environment and objects defined by a desired application are generated and a work of confirmation and modification by a user can easily be done. Thereby, a cost required for a complicated relating procedure indispensable to an interactive operating system is reduced.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A spatial data relationship displaying method comprising:
    acquiring server definition data representing an outline of features of data having a hierarchical structure generated by a server;
    acquiring application definition data representing an outline of features of data having a hierarchical structure generated by an application which manipulates objects including manipulating spatial relationships between the objects;
    acquiring server object property structure data which corresponds to the server and application object property structure data which corresponds to the application;
    generating a relationship between an object of a first image as defined by the server and an object of a second image as defined by the application based on the server definition data, the application definition data, the object property structure data and thesaurus data;
    displaying object hierarchical structure data of the server, and object hierarchical structure data of the application, with the generated relationship;
    graphically indicating on a display the generated relationship between said object of the first image as defined by the server and said object of the second image as defined by the application;
    displaying the object property structure data of an object pointed to by indication means on the display; and
    modifying and deciding the relationship between the objects based on a confirmation operation input from the indication means.

2. A spatial data relationship displaying method according to claim 1, wherein in displaying the object hierarchical structure data, the form of display is changed depending on the type of a parent/child relationship between the objects.

3. A spatial data relationship displaying method according to claim 1, wherein in displaying the object hierarchical structure data, an object of a lowermost layer and an object of an intermediate layer are distinctively displayed.

4. A spatial data relationship displaying method according to claim 1, wherein in displaying a relationship between the objects, a similarity between the objects is displayed in a form reflected by types of lines or thickness of the lines.

5. A spatial data relationship displaying method according to claim 1, wherein the relationship between the objects is displayed in an order of a degree of certainty representing a height of a degree of association between the objects.

6. A spatial data relationship displaying method according to claim 1, wherein the object hierarchical structure and/or the relationship between the object are displayed with distinctions of each view selected by a user.

7. A spatial data relationship displaying method according to claim 1, wherein in generating the relationship between the objects the relationship is generated by replacing a name of the object of the server or the application using the thesaurus data.

8. A spatial data relationship displaying method according to claim 7, wherein in generating the relationship between the objects the relationship is generated by corresponding object property data of the objects of the server and objects of the application.

9. A spatial data relationship displaying method according to claim 7, further comprising:
    displaying a relationship between the object property structure data of the objects pointed to by the indication means.

10. A spatial data relationship displaying method according to claim 1, wherein in generating the relationship between the objects the relationship is generated by corresponding object property data of the objects of the server and objects of the application.

11. A spatial data relationship displaying method according to claim 10, further comprising:
    displaying a relationship between the object property structure data of the objects pointed to by the indication means.

12. A spatial data relationship displaying method according to claim 1, further comprising:
    displaying a list of the server definition data and a list of the application definition data on the display.

13. A spatial data relationship displaying system comprising:
    a memory for storing thesaurus data;
    a display for displaying data;
    an indication device for inputting an instruction from a user; and
    a central processing device for acquiring server definition data representing an outline of features of data having a hierarchical structure generated by a server, application definition data representing an outline of features of data having a hierarchical structure generated by an application which manipulates objects including manipulating spatial relationships between the objects and server object property structure data which corresponds to the server and application object property structure data which corresponds to the application, generating a relationship between an object of a first image as defined by the server and an object of a second image as defined by the application based on the server definition data, the application definition data, the object property structure data and the thesaurus data, displaying object hierarchical structure data of the server and object hierarchical structure data of the application with the generated relationship, and graphically indicating on the display the generated relationship between said object of the first image as defined the server and said object of the second image as defined by the application,
    wherein the central processing device displays the object property structure data of an object pointed to by the indication device on the display, and modifies and decides the relationship between the objects based on a confirmation operation input from the indication device.

14. A spatial data relationship displaying system according to claim 13, wherein the central processing device generates the relationship between the objects by replacing a name of the object of the server or the application using the thesaurus data.

15. A spatial data relationship displaying system according to claim 14, wherein the central processing device generates the relationship between the objects by corresponding object property data of the objects of the server and of the application.

16. A spatial data relationship displaying system according to claim 13, wherein the central processing device generates the relationship between the objects by corresponding object property data of the objects of the server and of the application.

17. A spatial data relationship displaying system according to claim 13, wherein the central processing device displays a relationship between the object property structure data of the objects pointed to by the indication device on the display.

18. A spatial data relationship displaying system according to claim 13, wherein the central processing device displays a list of the server definition data and a list of the application definition data on the display.

19. A spatial data relationship displaying system according to claim 13, wherein the central processing device displays a similarity of the relationship between the objects in a form of types of lines or thickness of the lines on the display.

20. A spatial data relationship displaying system according to claim 13, wherein the central processing unit displays the object hierarchical structure and/or the relationship between the object with distinctions of each view selected by the indication device.

21. A spatial data relationship displaying method comprising:
    select-inputting an application to be displayed with a relationship between objects and a relationship between properties;
    select-inputting a server to be displayed with the relationship between objects and the relationship between properties to the application;
    retrieving an application definition data and an object hierarchical structure data of the application from a first data memory based on the selected application;
    retrieving a server definition data indicating an outline of map information and an object hierarchical structure data of the server from a second data memory based on the selected server;
    applying a similarity to generate the relationship between objects, the similarity being based on a result of comparing a name defined by the object hierarchical structure data of the application with a name defined by the object hierarchical structure data of the server;
    outputting the generated relationship between objects in accordance with the similarity;
    retrieving an object property structure data of the application in connection with an object in which the relationship between objects is generated, from the first data memory;
    retrieving an object property structure data of the server in connection with an object in which the relationship between objects is generated, from the second data memory;
    generating the relationship between properties based on a result of comparing a data type defined by the object property structure data of the application with a data type defined by the object property data of the server, if a name defined by the object property structure data of the application is matched with a name defined by the object property structure data of the server as a synonym;
    outputting the generated relationship between properties;
    retrieving an object data including the map information, from the second data memory;
    converting a figure data of the object data into a first object structure defined by the application based on a value of a unit system or a coordinate system defined by the application definition data and the server definition data;
    converting a remaining data other than the figure data of the object data into a second object structure defined by the application based on the relationship between properties; and
    outputting the first object structure and the second object structure.

22. The spatial data relationship displaying method according to claim 21, wherein a line type reflecting the similarity of the relationship between objects is displayed.

* * * * *